United States Patent [19]
Robertson

[11] Patent Number: 5,931,012
[45] Date of Patent: *Aug. 3, 1999

[54] AIR CONDITIONING/HEATING FACILITY

[76] Inventor: Ian John Robertson, 71 San Mateo Ave., Mildura, Victoria 3500, Australia

[*] Notice: This patent issued on a continued prosecution application filed under 37 CFR 1.53(d), and is subject to the twenty year patent term provisions of 35 U.S.C. 154(a)(2).

[21] Appl. No.: 08/875,821
[22] PCT Filed: Feb. 6, 1996
[86] PCT No.: PCT/AU96/00055
  § 371 Date: Sep. 19, 1997
  § 102(e) Date: Sep. 19, 1997
[87] PCT Pub. No.: WO96/24503
  PCT Pub. Date: Aug. 15, 1996

[30] Foreign Application Priority Data

Feb. 8, 1995 [AU] Australia .................... PN1007

[51] Int. Cl.$^6$ ..................... F25D 15/00
[52] U.S. Cl. ............... 62/237; 62/244; 62/262; 248/419; 454/119; 454/133
[58] Field of Search ............ 62/237, 244, 262, 62/263; 248/278.1, 419; 454/119, 133

[56] References Cited

U.S. PATENT DOCUMENTS

| | | | |
|---|---|---|---|
| 2,683,407 | 7/1954 | Takach | 454/119 |
| 2,746,372 | 5/1956 | Smith et al. | 62/262 |
| 3,360,954 | 1/1968 | Snider et al. | 454/119 |
| 3,777,506 | 12/1973 | Hergatt et al. | 62/237 |
| 3,860,206 | 1/1975 | Wening | 62/262 |
| 4,901,538 | 2/1990 | Anthony | 62/237 |

*Primary Examiner*—William E. Tapolcai
*Attorney, Agent, or Firm*—Larson & Taylor

[57] ABSTRACT

A road side airconditioning and/or heating facility in, or adjacent, a parking bay for a vehicle, including and supporting, in use, an airconditioning unit and/or heating unit, or reverse cycle unit (11), relative to the vehicle and for temporary association with the vehicle, and having a flexible supply duct (14a) and a flexible return duct (14b), and having means (15) to, in use, associate the ducts with the interior of the cabin of the vehicle, whereby conditioned and/or heated air may be supplied to the cabin of the vehicle. The unit (11) is supported on a pillar (19) via a pulley arrangement (22) to allow the unit to be raised and lowered relative to the vehicle, and an arm arrangement (20) pivotable in a horizontal plane to allow lateral adjustment of the unit into and out of the parking bay.

16 Claims, 1 Drawing Sheet

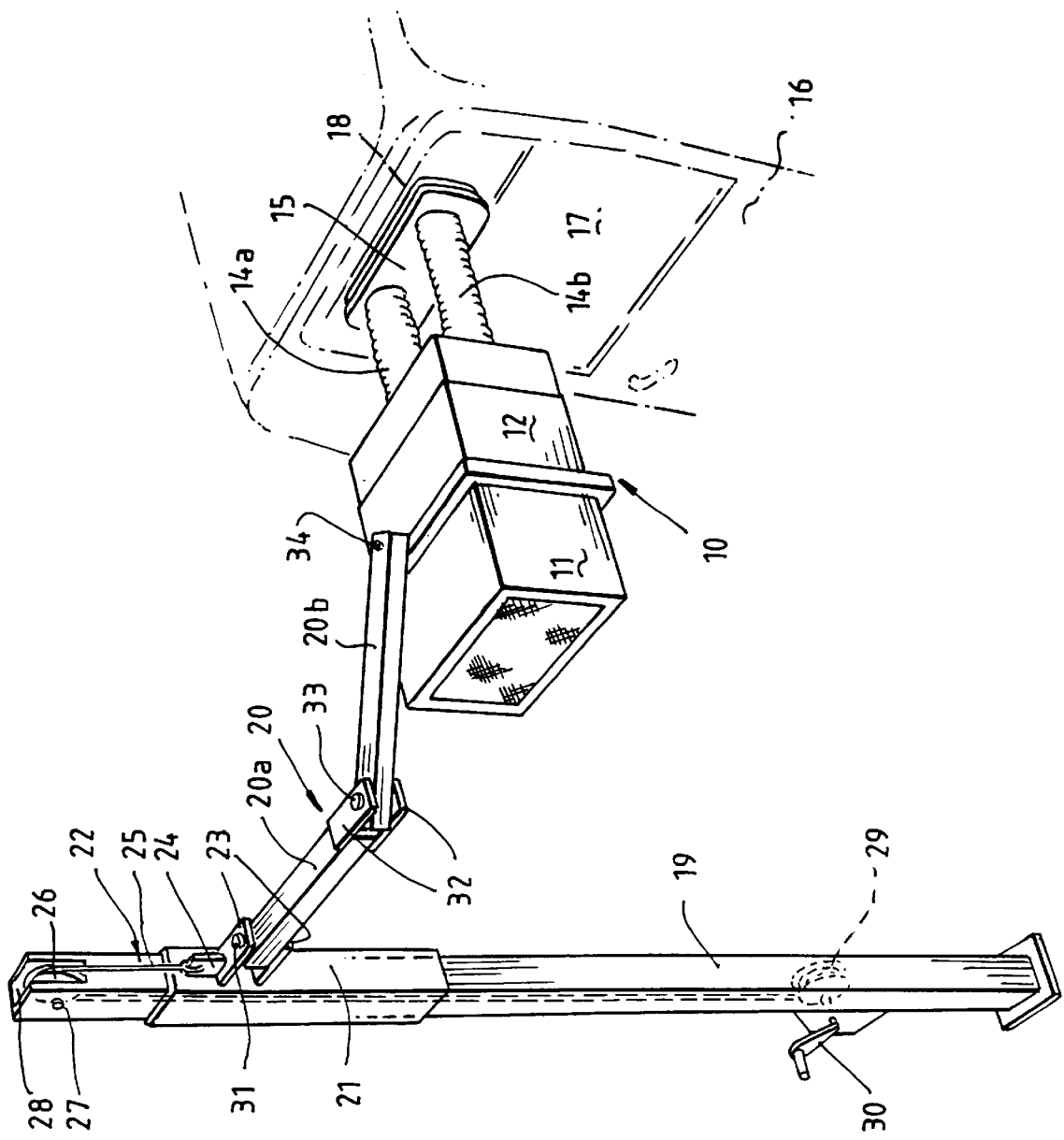

AIR CONDITIONING/HEATING FACILITY

TECHNICAL FIELD

This invention relates to an airconditioning or heating facility, or both an airconditioning and heating facility, such as a reverse cycle facility, adapted specifically for providing airconditioned air or heated air, or selectively both, for vehicles such as trucks.

BACKGROUND ART

With trucks hauling loads over long distances it is common practice for drivers to stop for periods of rest or sleep at roadside parking areas, sometimes associated with restaurants or other facilities, whilst the truck has sleeping facilities for the driver. Such trucks are conventionally airconditioned and heated via their own vehicle mounted airconditioning or heating units which operate whilst the prime mover's engine is running and which is satisfactory when the truck is in motion. However, when the truck is stopped for the driver to have rest or sleep it is not practical for the engine to remain running for what may be many hours. As a result, during hot or cold days and nights the interior of the cabin of the truck becomes hot or cold which is not conducive for driver comfort whilst resting or sleeping.

It is therefore an object of the present invention to provide a road side airconditioning or heating facility, or facility for both airconditioning or heating, whereby airconditioned and/or heated air as required can be introduced into the cabin of the vehicle.

DISCLOSURE OF THE INVENTION

The invention therefore envisages a road side airconditioning and/or heating facility in, or adjacent, a parking bay for a vehicle, including and supporting, in use, an airconditioning unit and/or heating unit, or reverse cycle unit, relative to said vehicle and for temporary association with the vehicle, and having an outlet from the unit, and means, in use, to associate the outlet with the interior of the cabin of the vehicle, whereby conditioned and/or heated air may be supplied to the cabin of the vehicle.

Preferably the means to associate the outlet with the interior of the cabin of the vehicle is a supply duct connected to the outlet and supplying the cabin of the vehicle.

Preferably the supply duct is a flexible duct.

Preferably the operation of the facility is controlled by a coin, token or card operated control means controlling electrical power supply to the unit.

Preferably the outlet is associated with means adapted to be jammed between the top of the window frame of the door of the vehicle and an adjustable window panel within the door frame.

Preferably the unit further has at least one inlet with means to also, in use, associated the inlet with the interior of the cabin of the vehicle and return air to the unit.

Preferably the means to associate the inlet with interior of the cabin of the vehicle is a return duct, and preferably the return duct is a flexible duct.

Preferably the unit is supported by means allowing the height of the unit to be adjusted.

Preferably the means supporting the unit also allows from lateral adjustment of the unit into and out of the parking bay.

BRIEF DESCRIPTION OF THE DRAWING

One preferred embodiment of the invention will now be described with reference to the accompanying drawing, which is a schematic view of a road side airconditioning and/or heating facility.

BEST MODE FOR CARRYING OUT THE INVENTION

Referring to the drawing, there is shown schematically a supply unit 10 for conditioned air, or heated air, or both, such as by a reverse cycle unit. In the particular example of the invention the supply unit incorporates an airconditioning unit 11 which may be a domestic airconditioning unit of the type that conventionally may be permanently mounted through walls or window spaces of a dwelling. The airconditioning unit 11 supplies conditioned (cooled) air to a box shaped supply chamber 12.

A flexible supply hose 14a is provided and adapted to be plugged into an outlet from the chamber 12, or permanently attached to the outlet, and of a length sufficient to reach the window space of a door 16 through which access to the cabin of a vehicle is obtained. A flexible return hose 14b is also provided adapted to be plugged into an inlet to the chamber 12, or permanently attached to the inlet. The ends of the hoses 14a and 14b carry a window engagement panel 15 of either rigid material, or of canvas or like material, with a rigid frame, and adapted to be jammed between the top of a window panel 17 and the top 18 of the window frame of the door 16 with the window panel being partially wound down to accommodate the panel 15.

The supply unit 10 may be supported at an appropriate height above the ground by a support pillar 19 with an adjustable arm arrangement 20 carried by a sleeve 21 moveable up and down the pillar by a pulley arrangement 22. More particularly the pillar 19 may be of hollow rectangular cross-section, and the sleeve 21 of similar cross-section but being larger to closely surround the pillar but capable of axial sliding movement up and down the pillar. The sleeve 21 carries a pair of vertically spaced apart lugs 23, the uppermost one of which carries an eyelet 24 to which a cable 25 is attached to extend upwardly therefrom and over an upper pulley 26 mounted on an axle 27 within the upper end of the pillar with a slot 28 being provided through the wall of the pillar to allow access for the cable to the pulley which is mounted such that its circumference extends partially outside the wall of the pillar at the slot 28. The cable extends downwardly within the hollow interior of the pillar to a take-up pulley 29 onto and off which the cable can be wound by a handle 30 associated with the pulley. A locking mechanism should be incorporated with to lock the pulley 29 against rotation when the required height of the sleeve 21 for the height of a particular vehicle is reached whereby the supply unit 10 is positioned appropriately relative to the top part of the window space with which it is to be associated to supply cooled or heated air.

One end of an inboard pivotable arm 20a of the arm arrangement 20 is received between the lugs 23 carried by the sleeve 21 and pivots about a vertical axis via a pivot pin 31, whilst the opposite end of arm 20a carries upper and lower lugs 32 between which are received one end of an outboard pivotable arm 20b of the arm arrangement which pivots relative to the inner arm about a vertical axis via a pivot pin 33. The outer end of the arm 20b is pivotable connected to the supply unit 10 via a further pivot pin 34.

As will be apparent when a road transport vehicle, or other type of vehicle, is parked next to the facility, raising or lowering of the unit 10 on the pillar via the arm arrangement 20, sleeve 21 and pulley arrangement 22, combined with manipulation of the arms 20a and 20b of the arm arrangement 20, allows the unit to be positioned adjacent the top part of the vehicle window space through the door of the vehicle, and, with the window panel wound down sufficiently, the engagement panel 15 can be positioned to engage beneath the lower edge of the top 18 of the window frame of the door whereafter the window panel 17 can be raised to engage beneath the lower edge of the panel 15 to jam the panel in position between the lower edge of the top of the window frame and the top edge of the window panel.

The cable for electrical power supply to the unit 10 may extend upwardly through the hollow interior of the pillar 19 then along, or through, the arm arrangement 20 if the arms 20a and 20b are hollow, although many alternative ways of coupling the unit 10 to an electrical power supply will be apparent to those skilled in the art, such as up the outside of the pillar 19 and across the arm arrangement 20, with loose couplings between the cable and the pillar and the arm arrangement, with sufficient slack in the cable to accommodate up and down movement and lateral movement of the unit 10 relative to the parking bay. The power supply may be linked to the unit 10 via a coin, token or card operated controller such as a Nobo Orion 512 controller as supplied by the Cothern Pty Ltd of Melbourne Australia, and either mounted on the pillar 19 or on the unit 10 itself.

In the embodiment described the facility is permanently fixed to the ground, although alternatively the facility may be mounted on a frame having means, such as wheels, whereby the facility may be moved around. In addition, forms of mechanisms other than a pulley and cable mechanism, or an arm arrangement, may be used for raising and lowering, and laterally manoeuvring, the supply unit 10 relative to the parking bay.

I claim:

1. A road side airconditioning and/or heating facility in, or adjacent, a parking bay for a vehicle, including and supporting, in use, an airconditioning unit and/or heating unit, or reverse cycle unit, relative to said vehicle and for temporary association with the vehicle, and having an outlet from the unit, and means, in use, to associate the outlet with the interior of the cabin of the vehicle, whereby conditioned and/or heated air may be supplied to the cabin of the vehicle, said facility further comprising means allowing adjustment of both the height of the unit and its lateral position, wherein the means allowing the height of the unit to be adjusted is a cable and pulley arrangement associated with means supporting said unit and moveable up and down a support pillar.

2. A facility as claimed in claim 1, wherein the means to associate the outlet with the interior of the cabin of the vehicle is a supply duct connected to the outlet and supplying the cabin of the vehicle.

3. A facility as claimed in claim 2, wherein the supply duct is a flexible duct.

4. A facility as claimed in claim 1, wherein the operation of the unit is controlled by a coin, token or card operated control means controlling electrical power supply to the unit.

5. A facility as claimed in claim 1, wherein the outlet is associated with means adapted to be jammed between the top of the window frame of the door of the vehicle and an adjustable window panel within the door frame.

6. A facility as claimed in claim 1, wherein the unit further has at least one inlet with means to also, in use, associated the inlet with the interior of the cabin of the vehicle and return air to the unit.

7. A facility as claimed in claim 6, wherein the means to associate the inlet with interior of the cabin of the vehicle is a flexible return duct.

8. A unit claimed in claim 1, wherein the means allowing adjustment of its lateral position allows lateral adjustment of the unit into and out of the parking bay.

9. A facility as claimed in claim 8, wherein lateral adjustment of the unit into and out of the parking bay is an arm arrangement forming part of the means supporting said unit, and pivotable in a horizontal plane.

10. A road side airconditioning and/or heating facility in, or adjacent, a parking bay for a vehicle, including and supporting, in use, an airconditioning unit and/or heating unit, or reverse cycle unit, relative to said vehicle and for temporary association with the vehicle, and having an outlet from the unit, and means, in use, to associate the outlet with the interior of the cabin of the vehicle, whereby conditioned and/or heated air may be supplied to the cabin of the vehicle, said facility further comprising means allowing adjustment of both the height of the unit and its lateral position, wherein the means allowing adjustment of its lateral position allows lateral adjustment of the unit into and out of the parking bay and comprises an arm arrangement forming part of the means supporting said unit and being pivotable in a horizontal plane.

11. A facility as claimed in claim 10, wherein the means to associate the outlet with the interior of the cabin of the vehicle is a supply duct connected to the outlet and supplying the cabin of the vehicle.

12. A facility as claimed in claim 11, wherein the supply duct is a flexible duct.

13. A facility as claimed in claim 10, wherein the operation of the unit is controlled by a coin, token or card operated control means controlling electrical power supply to the unit.

14. A facility as claimed in claim 10, wherein the outlet is associated with means adapted to be jammed between the top of the window frame of the door of the vehicle and an adjustable window panel within the door frame.

15. A facility as claimed in claim 10, wherein the unit further has at least one inlet with means to also, in use, associated the inlet with the interior of the cabin of the vehicle and return air to the unit.

16. A facility as claimed in claim 15, wherein the means to associate the inlet with interior of the cabin of the vehicle is a flexible return duct.

* * * * *